April 1, 1952
D. M. WATTS ET AL
2,591,480
ADJUSTABLE SEAT SUPPORT
Filed Aug. 26, 1949
2 SHEETS—SHEET 1
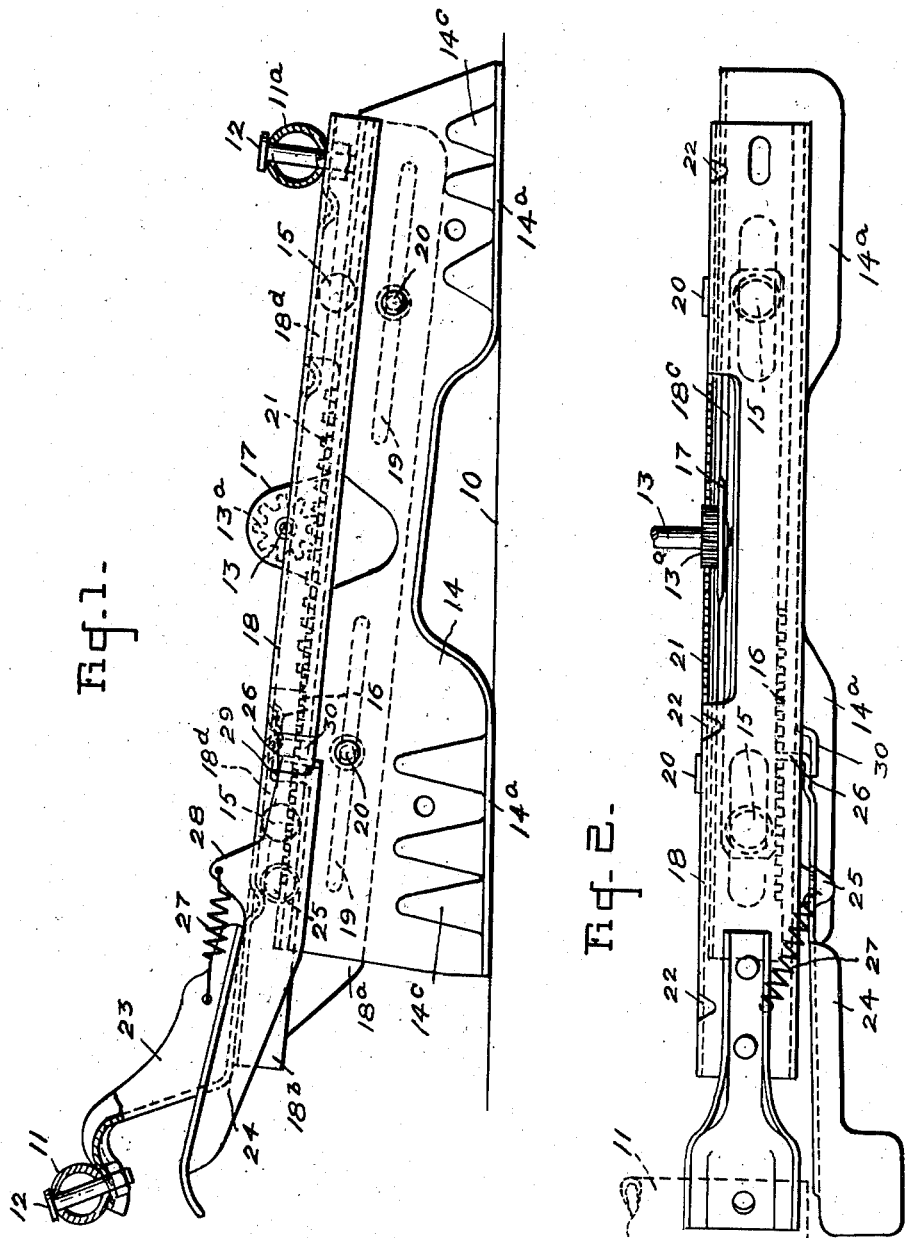
INVENTOR.
DANIEL M. WATTS.
BY HOLLIS P. BROWN.
George Rex Frye
Attorney.

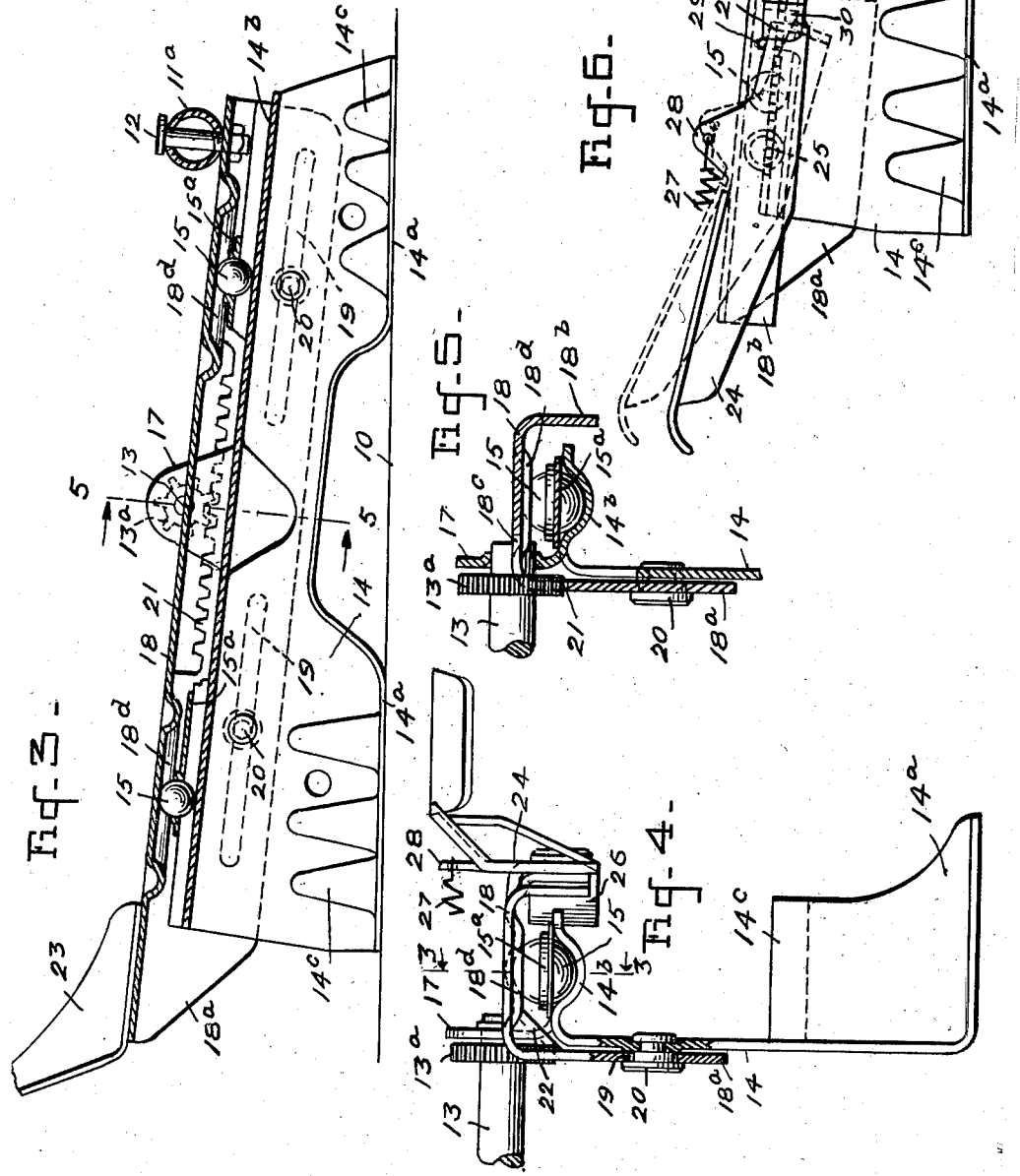

Patented Apr. 1, 1952

2,591,480

UNITED STATES PATENT OFFICE 2,591,480

ADJUSTABLE SEAT SUPPORT

Daniel M. Watts and Hollis P. Brown, Pontiac, Mich., assignors to American Forging and Socket Company, Pontiac, Mich., a corporation of Michigan Application August 26, 1949, Serial No. 112,598

5 Claims. (Cl. 155—14)

This invention relates to adjustable supporting devices for the seats of vehicles, and has for its primary object the provision of a compact, comparatively inexpensive seat supporting device utilizing ball bearings to minimize friction during adjustments.

In modern automobiles with their increased width of seats to accommodate three or more passengers severe stresses and strains are imposed upon the seat supports, particularly when the vehicle is subjected to rapid acceleration, quick stops, sudden turns, etc., and provision must be made to prevent separation of the movable members of the supports from the fixed members at all times as well as to achieve positive retention of desired adjustments of the seats without looseness or rattling. One of the objects of the present invention is to accomplish these desiderata with seat supports made of sheet metal.

Another object of this invention is the arrangement of a cross-shaft for synchronizing the movements of the opposite sides of a vehicle seat so that the weight of the seat and its load is borne entirely by parts other than the cross-shaft.

A further object of this invention is the provision of a simple latch mechanism for maintaining the seat at desired adjustments with means for preventing the latch from springing out of its desired position.

Other objects and advantages will be apparent from the following description wherein reference is made to the accompanying drawings, illustrating a presently preferred embodiment of our invention.

In the drawings:

Fig. 1 is a side elevation of a seat slide support made in accordance with our invention, the view being from the left side of a slide assembly for the front seat of a vehicle.

Fig. 2 is a plan view of the left seat slide support with parts broken away.

Fig. 3 is a detail vertical section taken substantially on the line 3—3 of Fig. 4.

Fig. 4 is an enlarged front view, with parts broken away and shown in section.

Fig. 5 is an enlarged cross-section taken substantially on the line 5—5 of Fig. 3, and Fig. 6 is a detail side view showing the latch mechanism in latched and open positions.

Referring now to the drawings, the reference numeral 10 designates a vehicle floor upon which, it is assumed for illustrative purposes, a conventional front seat (not shown) is desired to be adjustably supported. The forward lower member 11 and the rear lower member 11$^a$ of a tubular seat frame are suitably secured, as by bolts 12, to a pair of seat slide support assemblies, arranged respectively near each side of the vehicle, in position to support the seat adjacent each end thereof. Such assemblies are of similar but oppositely disposed constructions, and a description of one will accordingly suffice for both, although, as will be seen from an inspection of Fig. 6, only one assembly need be provided with latching mechanism to maintain desired adjustments. The locking effect is transmitted to the carriage of the other assembly through the agency of a synchronizing cross-shaft 13, as hereinafter pointed out.

The lower fixed portion of the support assembly comprises a track member 14 having horizontal bottom flanges 14$^a$ through which the track is secured to the vehicle floor, a substantially vertical web portion, and a top flange or shelf portion 14$^b$ in which is formed a longitudinal channel or trough to serve as the lower raceway for ball-bearings 15. (Note Figs. 4 and 5.) Track members 14 are stamped from sheet metal and vertical ribs 14$^c$ of different heighths are spaced lengthwise thereof and reinforce both the bottom flanges 14$^a$ and the central web to insure the necessary rigidity of the fixed track members. The outer edge portion of the top flange 14$^b$ of one of the track members is also provided with notches 16 throughout a portion of its length (Figs. 2 and 6) for cooperation with a latch mechanism carried by the movable carriage associated therewith, as will be hereinafter pointed out.

Substantially midway of track member 14 a portion of the central web and upper flange 14$^b$ is struck out and bent upwardly to form an ear 17, (Figs. 3 and 5) which ear is punched to form a journal for one end portion of the synchronizing cross-shaft 13 adjacent the pinion 13$^a$ fixed on the cross-shaft.

A seat-supporting carriage or slide member 18 cooperates with each fixed track member 14, resting upon the balls 15 thereon. The slide member 18 is also formed of sheet metal, and in cross section (Figs. 4 and 5) appears as of inverted channel-shape with a longer inner leg 18$^a$ paralleling the central web of the fixed track member 14 and a shorter outer leg 18$^b$ extending outside of the upper flange 14$^b$ of the fixed track member. A pair of spaced longitudinal slots 19 are punched from the longer inner leg 18$^a$ of the slide member (Figs. 3 and 4) and the shanks of headed studs 20 extend through slots 19 and are riveted, or otherwise secured, to the web of the fixed track member 14, whereby the slide members 18 are held against tilting or lateral movements relatively to the fixed track members. Slots 19 are of sufficient length to permit necessary travel of slide members 18 along the track members, the extent of such travel being limited by other elements, as hereinafter explained.

Approximately centrally of its length each slide member 18 is formed with an upwardly facing rack 21 by cutting out an elongated portion from its body portion adjacent its inner leg 18ª and from such inner leg to form an elongated slot 18ᶜ, the upper edge of the inner leg portion below such slot having rack teeth formed therein (Fig. 2). This arrangement enables proper aligned meshing of racks 21 with the pinions 13ª on the opposite ends of cross-shaft 13 for synchronizing the movements of both ends of the seat while providing elongated slots in the slide members 18 through which ears 17 struck up from the fixed track members 14 extend to form journals for the ends of cross-shaft 13. It will be noted that all weight carrying parts of the seat supports are below cross-shaft 13, and the cross-shaft is free from strains from loaded seats tending to break or bend it out of synchronizing position.

Adjacent each end of the slide member 18, and in position to engage ball bearings 15, the body portions of the slide members are formed with inverted channel-shaped portions 18ᵈ serving as upper raceways for balls 15. The body portion of the slide member is indented at each end of raceways 18ᵈ, for strength, and for limiting the travel of the slide members 18 over balls 15. Ribs 22 may also be formed at spaced intervals at the intersections of body portion and legs of the slide members for strengthening purposes (Figs. 2 and 4).

Brackets 23 of suitable shape and size may be secured to the slide members 18 to enable the mounting of seats thereon of various sizes and with the forward portions of the seats elevated as desired above the rear portions of such seats.

The upper and lower channeled raceways 18ᵈ for the balls 15 serve as guides for the movements of the carriages 18 over the fixed track members 14, and the seat and attached slide members 18 move with a minimum of friction whenever the latch mechanism is released. A spacer 15ª is preferably arranged to maintain the two balls 15 on each track member 14 in proper relationship to each other at all times.

The latch mechanism for maintaining the seat in various adjusted positions is best shown in Figs. 1 and 6. A latch lever 24 is pivotally mounted between its ends on a pivot pin 25 extending laterally from the shorter outer leg 18ᵇ of the slide member 18 at the left side of the vehicle for ease of operation by the vehicle driver. The forward arm of latch lever 24 is flanged or otherwise formed to provide a hand hold to enable ready upswinging of such forward arm whenever it is desired to change the position of the seat. The rear arm of latch lever 24 is formed at its rear extremity with an inturned locking lug 26 adapted to enter any of the series of notches 16 cut in the outer edge of the upper flange 14ᵇ of the fixed track member 14. Means are provided for presenting upswinging of such locking lug 26 beyond latching position within one of such notches and a spring 27 is arranged to maintain such locking lug in latching position at all times except when the forward arm of latch lever 24 is swung upwards by manual effort. As herein shown, spring 27 is arranged between bracket 23 at the front of slide member 18 and an apertured ear 28 extending upwardly from the rear arm of latch lever 24 slightly rearward of pivot pin 25. Accordingly, spring 27 tends to raise the rear arm of latch lever 24 and the extent of its upward swinging movement is limited by the upper wall of a slot 29 open at its lower end and formed by notching and then outwardly embossing at one side of such notch to provide a guide for the rear portion of latch lever 24 during its swinging movements. Such embossed guide portion is shown at 30 in Fig. 2, and it will be noted that in addition to guiding the swinging movement of the latch lever such portion 30 also serves as a lateral reinforcement for the rear arm of the latch lever while it is in latching position, relieving twisting strains tending to bend the pivot pin 25.

In operation, when the forward arm of latch lever 24 is grasped and swung upwardly the locking lug 26 at the rear extremity of the latch lever will be swung downwardly against the tension of spring 27 to a position below the notched upper flange of the fixed track member 14, whereupon the seat may be readily moved toward or away from the dashboard of the vehicle as desired. When the latch lever is released, the spring 27 returns the locking lug 26 to raised position, where it enters the notch with which it is then aligned. The intermeshed racks 21 and pinions 13ª on cross-shaft 13 serve to synchronize the movements of the opposite ends of the vehicle seat and enable correct sliding of the entire seat even when only one person is seated thereon and pushes against only one end of the seat to effect its adjustment. Moreover, the elongated slot 18ᶜ in each slide member enables passage of the seat past the fixed ears 17 extending through such slots to journal cross-shaft 13, with the end walls of the slots forming positive stops for the slide members at the limits of desired seat travel.

The slide and track members may be shipped to the vehicle manufacturers fully assembled, and the manufacturer has merely to fasten the track members to the vehicle floor and the seats to the slide members. The cross-shaft ends may, if desired, be inserted into the journals formed by the apertured ears 17 by the manufacturer, or the right and left slide-track assemblies may be coupled for delivery to the manufacturer with the cross-shaft assembled therebetween.

While it is apparent that the illustrated embodiment of our invention herein disclosed is well calculated to adequately fulfill the objects and advantages herein stated, it is to be understood that the invention is susceptible to variation, modification and change within the spirit and scope of the subjoined claims.

We claim:

1. An adjustable seat support comprising right and left assemblies arranged adjacent the opposite sides of a vehicle and each comprising a track member adapted to be secured to the vehicle floor, a slide member adapted to be attached to a vehicle seat and movable over said track member, anti-friction means interposed between said track and slide members, and means for synchronizing the movements of the respective slide members, comprising upwardly facing tracks carried by the slide members and a cross-shaft arranged above said racks and carrying pinions meshing with said racks, the ends of said cross-shaft being journaled in supports carried by said track members.

2. An adjustable seat support comprising right and left assemblies arranged adjacent the opposite sides of a vehicle and each comprising a track member adapted to be secured to the vehicle floor, a slide member adapted to be attached to a vehicle seat and movable over said track member, anti-friction means interposed between said track and slide members, and means for synchronizing the movements of the respective slide members, comprising upwardly facing racks carried by the slide members and a cross-shaft arranged above said racks and carrying pinions meshing with said racks, the ends of said cross-shaft being journaled in ears integral with and bent upwardly above the remainder of said track members.

3. An adjustable seat support comprising right and left assemblies arranged adjacent the opposite sides of a vehicle and each comprising a track member adapted to be secured to the vehicle floor, a slide member adapted to be attached to a vehicle seat and movable over said track member, anti-friction means interposed between said track and slide members, and means for synchronizing the movements of the respective slide members, comprising upwardly facing racks integrally formed in the slide members and a cross-shaft arranged above said racks and carrying pinions meshing with said racks, the ends of said cross-shaft being journaled in ears integral with and bent upwardly above the remainder of said track members, said slide members having elongated slots cut therein adjacent said racks, and said ears projecting through said slots.

4. In an adjustable seat support, a track member of sheet metal having a bottom flange adapted to be secured to a vehicle floor, a vertical web, and a top flange provided with a longitudinal channel arranged to form a lower raceway for ball bearings, a slide member adapted to be attached to a vehicle seat and formed of sheet metal with a plurality of spaced inverted channel raceways therein to serve as upper raceways for ball bearings, the central portion of said slide member also being formed with an elongated slot, ball bearings interposed between said members and arranged with one bearing in each of said spaced raceways of the slide member, spacer means maintaining the ball bearings at desired distances from each other, said track member having a portion struck out and bent upwardly from said top flange to form an ear extending through said slot in the slide member in position to be engaged by the respective end walls of said slot to limit movement of the slide member in either direction, and means for latching said slide member in various adjusted positions.

5. In an adjustable seat support, a track member of sheet metal having a bottom flange adapted to be secured to a vehicle floor, a vertical web, and a top flange provided with a longitudinal channel arranged to form a lower raceway for ball bearings, a slide member adapted to be attached to a vehicle seat and formed of sheet metal with a plurality of spaced inverted channel raceways therein to serve as upper raceways for ball bearings, the central portion of said slide member also being formed with an elongated slot, ball bearings interposed between said members and arranged with one bearing in each of said spaced raceways of the slide member, spacer means maintaining the ball bearings at desired distances from each other, said track member having a portion struck out and bent upwardly from said top flange to form an ear extending through said slot in the slide member in position to be engaged by the respective end walls of said slot to limit movement of the slide member in either direction, means for latching said slide member in various adjusted positions, said slide member being shaped as an inverted trough with a longer inner leg paralleling the web of the track member and having spaced longitudinal slots therein adjacent its lower edge, and headed studs carried by the track member with their shanks extending through said last mentioned slots, whereby tilting and lateral separation between said members are prevented.

DANIEL M. WATTS.
HOLLIS P. BROWN.

REFERENCES CITED

The following references are of record in the file of this patent:

UNITED STATES PATENTS

| Number | Name | Date |
|---|---|---|
| 2,127,610 | Moore | Aug. 23, 1938 |
| 2,139,174 | Saunders | Dec. 6, 1938 |
| 2,210,727 | McGregor | Aug. 6, 1940 |
| 2,226,374 | Gieleghem | Dec. 24, 1940 |
| 2,278,101 | Browne | Mar. 31, 1942 |
| 2,500,316 | Kramer | Mar. 14, 1950 |